United States Patent
Chang et al.

(10) Patent No.: US 9,959,306 B2
(45) Date of Patent: May 1, 2018

(54) PARTITION-BASED INDEX MANAGEMENT IN HADOOP-LIKE DATA STORES

(71) Applicant: International Business Machines Corporation, Armonk, NY (US)

(72) Inventors: Yuan-Chi Chang, Armonk, NY (US); Liana L. Fong, Irvington, NY (US); Wei Tan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 14/737,586

(22) Filed: Jun. 12, 2015

(65) Prior Publication Data

US 2016/0364424 A1    Dec. 15, 2016

(51) Int. Cl.
    *G06F 17/30*     (2006.01)

(52) U.S. Cl.
    CPC .... *G06F 17/30339* (2013.01); *G06F 17/3038* (2013.01); *G06F 17/30091* (2013.01); *G06F 17/30289* (2013.01); *G06F 17/30321* (2013.01); *G06F 17/30336* (2013.01); *G06F 17/30377* (2013.01); *G06F 17/30592* (2013.01); *G06F 17/30584* (2013.01); *G06F 17/30946* (2013.01)

(58) Field of Classification Search
    CPC ........ G06F 17/30321; G06F 17/30339; G06F 17/30377; G06F 17/3038; G06F 17/30584; G06F 17/30946; G06F 11/2094; G06F 11/2097; G06F 17/30091; G06F 17/30289; G06F 17/30336; G06F 17/30362; G06F 17/30592; G06F 2201/80
    See application file for complete search history.

(56) References Cited

U.S. PATENT DOCUMENTS

| | | | |
|---|---|---|---|
| 6,591,269 B1 | 7/2003 | Ponnekanti | |
| 7,987,164 B2 | 7/2011 | Hu et al. | |
| 8,380,701 B1 | 2/2013 | Konik et al. | |
| 8,935,232 B2 | 1/2015 | Abadi et al. | |
| 2006/0085405 A1* | 4/2006 | Hsu | G06F 17/30707 707/E17.09 |

(Continued)

OTHER PUBLICATIONS

"Accelerated Examination Support Document," International Business Machines Corporation, Dated Jan. 8, 2016, 12 pages.

(Continued)

*Primary Examiner* — Anh Ly
(74) *Attorney, Agent, or Firm* — Leonard T. Guzman

(57) ABSTRACT

A method for processing a dataset in a partitioned distributed storage system having data stored in a base table and an index stored in an index table, may include receiving base and index table metadata from the partitioned distributed storage system, where the base and index table metadata includes respective table partition information. The method may further include partitioning the dataset into a set of base-delta files according to the base table metadata, and generating a set of index-delta files corresponding with the base-delta files according to the index table metadata. The method may additionally include updating the partitioned distributed storage system with the set of base-delta and the set of index-delta files, where a first update of the base table is synchronous with a second update of the index table.

20 Claims, 6 Drawing Sheets

(56) References Cited

U.S. PATENT DOCUMENTS

| | | | | |
|---|---|---|---|---|
| 2007/0276771 | A1* | 11/2007 | Saeger | G06Q 50/06 705/412 |
| 2009/0171885 | A1 | 7/2009 | Silberstein et al. | |
| 2009/0216910 | A1* | 8/2009 | Duchesneau | G06F 9/5072 709/250 |
| 2009/0240663 | A1 | 9/2009 | Plattner et al. | |
| 2010/0036886 | A1* | 2/2010 | Bouloy | G06F 17/30498 707/714 |
| 2010/0082630 | A1* | 4/2010 | Zagelow | G06F 17/30336 707/741 |
| 2010/0281005 | A1* | 11/2010 | Carlin | G06F 17/30312 707/696 |
| 2011/0219020 | A1 | 9/2011 | Oks et al. | |
| 2013/0110881 | A1 | 5/2013 | Bender | |
| 2013/0290282 | A1 | 10/2013 | Faerber et al. | |
| 2013/0318277 | A1* | 11/2013 | Dalal | G06F 13/1652 710/308 |
| 2014/0172794 | A1 | 6/2014 | Bartholoma et al. | |
| 2014/0279855 | A1 | 9/2014 | Tan et al. | |
| 2014/0279881 | A1 | 9/2014 | Tan et al. | |
| 2015/0032725 | A1 | 1/2015 | Barykin et al. | |
| 2015/0039969 | A1 | 2/2015 | Motwani et al. | |
| 2015/0074151 | A1 | 3/2015 | Chaiken et al. | |
| 2015/0242451 | A1 | 8/2015 | Bensberg et al. | |
| 2016/0048572 | A1* | 2/2016 | Khandelwal | G06F 17/30592 707/604 |
| 2016/0055188 | A1 | 2/2016 | Goel et al. | |
| 2017/0132091 | A1* | 5/2017 | Leshinsky | G06F 11/1471 707/741 |

OTHER PUBLICATIONS

Chang, et al., "Partition-Based Index Management in Hadoop-Like Data Stores," U.S. Appl. No. 14/993,166, filed Jan. 12, 2016.
List of IBM Patents or Patent Applications Treated as Related, dated Jan. 11, 2016, 2 pages.
Cipar et al., "LazyBase: Trading Freshness for Performance in a Scalable Database", EuroSys '12: Proceedings of the 7th ACM European Conference on Computer Systems, Apr. 2012, pp. 1-14, Copyright © 2012 ACM, ISBN: 978-1-4503-1223-3/12/04.
Anonymous, "Hadoop Market Size, Adoption and Growth Through 2020", Experfy Insights, Jun. 22, 2014, 5 pages, © 2015 Experfy, Inc., www.experfy.com/blog/hadoop-market-size-adoption-growth-2020/.
IBM, "Building indexes during a load operation", IBM Knowledge Center, last updated: Oct. 27, 2006, 1 page. http://publib.boulder.ibm.com/infocenter/db2luw/v9/index.jsp?topic=%2Fcom.ibm.db2.udb.admin.doc%2Fdoc%2Fc0007939.htm.
Miner, D., "Introducing Pivotal HD", Pivotal, Feb. 25, 2013, pp. 1-5, © 2015 Pivotal Software, Inc. http://blog.gopivotal.com/features/introducing-pivotal-hd#sthash.zatM6xq7.dpuf
Silberstein et al., "Efficient Bulk Insertion into a Distributed Ordered Table", SIGMOD '08: Proceedings of the 2008 ACM SIGMOD International Conference on Management of Data, Jun. 2008, pp. 765-778, Copyright © 2008 ACM, ISBN: 978-1-60558-102-6/08/06.
Sumbaly et al., "Serving Large-scale Batch Computed Data with Project Voldemort", FAST '12: Proceedings of the 10th USENIX Conference on File Storage Technologies, Feb. 2012, pp. 1-13.
Sumbaly et al., "The "Big Data" Ecosystem at LinkedIn", SIGMOD '13: Proceedings of the 2013 ACM SIGMOD International Conference on Management of Data, Jun. 2013, pp. 1125-1134, Copyright © 2013 ACM, ISBN: 978-1-4503-2037-5/13/06.
Unknown, "Apache HBase™ Reference Guide," Section 60. Catalog Tables, Version 2.0.0-SNAPSHOT, last updated Mar. 13, 2015, pp. 174, https://hbase.apache.org/book.html#arch.bulk.load.
Unknown, "Apache HBase™ Reference Guide," Section 66. Bulk Loading, Version 2.0.0-SNAPSHOT, last updated Mar. 13, 2015, pp. 212-213, https://hbase.apache.org/book.html#arch.bulk.load.
Unknown, "Apache HBase™ Reference Guide," Section 67. HDFS, Version 2.0.0-SNAPSHOT, last updated Mar. 13, 2015, pp. 214, https://hbase.apache.org/book.html#arch.bulk.load.
Mell, "The NIST Definition of Cloud Computing: Recommendations of the National Institute of Standards and Technology," National Institute of Standards and Technology, U.S. Department of Commerce, Special Publication 800-145, Sep. 2011, pp. 1-7, Gaithersburg, MD.

* cited by examiner

PARTITION-BASED INDEX MANAGEMENT IN HADOOP-LIKE DATA STORES

BACKGROUND

The present disclosure relates to computer software, and more specifically, to a framework for processing large datasets in partitioned distributed storage systems.

Distributed storage systems may enable large amounts of data to be stored in clusters of disparate compute nodes. Computer nodes in distributed storage system cluster may be arranged in a master-worker architecture with master nodes negotiating transactions with client applications and worker nodes executing these transactions. In some embodiments, data may be stored on compute nodes in partitions, or logical divisions of a storage space.

SUMMARY

According to embodiments of the present disclosure, a method for processing a dataset in a partitioned distributed storage system having data stored in a base table and an index stored in an index table, may include receiving base and index table metadata from the partitioned distributed storage system, where the base and index table metadata includes respective table partition information. The method may further include partitioning the dataset into a set of base-delta files according to the base table metadata, and generating a set of index-delta files corresponding with the base-delta files according to the index table metadata. The method may additionally include updating the partitioned distributed storage system with the set of base-delta and the set of index-delta files, where a first update of the base table is synchronous with a second update of the index table.

Various embodiments are directed towards a system for processing a dataset in a partitioned distributed storage system having data stored in a base table and an index stored in an index table. The system may include one or more computing nodes having a memory and a processor; and a computer readable storage medium of the one or more computing nodes having program instructions embodied therewith, the program instructions executable by the processor to cause the system to: receive base and index table metadata from the partitioned distributed storage system, wherein the base and index table metadata includes respective table partition information; partition the dataset into a set of base-delta files according to the base table metadata; generate a set of index-delta files corresponding with the base-delta files according to the index table metadata; and update the partitioned distributed storage system with the set of base-delta and the set of index-delta files, where a first update of the base table is synchronous with a second update of the index table.

According to various embodiments, a computer program product for processing a dataset in a partitioned distributed storage system having data stored in a base table and an index stored in an index table, the computer program product including a computer readable storage medium having program instructions embodied therewith, wherein the computer readable storage medium is not a transitory signal per se, the program instructions executable by a processing circuit to cause the processing circuit to perform a method comprising: receiving base and index table metadata from the partitioned distributed storage system, wherein the base and index table metadata includes respective table partition information; partitioning the dataset into a set of base-delta files according to the base table metadata; generating a set of index-delta files corresponding with the base-delta files according to the index table metadata; and updating the partitioned distributed storage system with the set of base-delta and the set of index-delta files, where a first update of the base table is synchronous with a second update of the index table.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
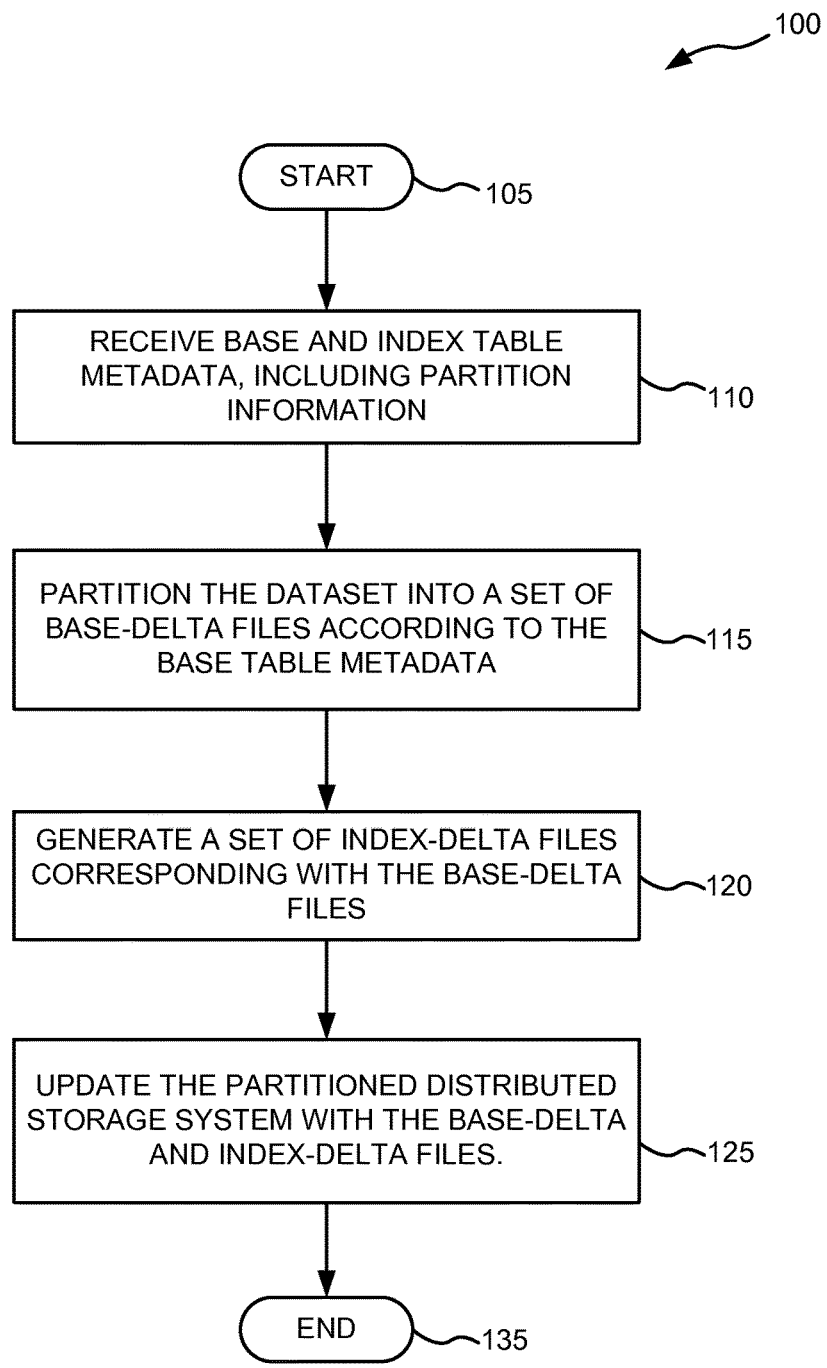
FIG. 1 depicts a flowchart of a computer implemented method for processing a dataset in a partitioned distributed storage system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer software, more particular aspects relate to a framework for processing large datasets in partitioned distributed storage systems. While the present disclosure is not necessarily limited to such applications, various aspects of the disclosure may be appreciated through a discussion of various examples using this context.

Embodiments of the present disclosure are based on the recognition that some distributed storage systems (DSS) are built on the append only access model. The append only access model improves the efficiency of distributed storage systems by enabling a DSS design to take advantage of fast sequential disk writes against slow random writes. Instead of updating data records in place via random writes, this type of DSS appends a new version of the data record with new timestamp to signal the deletion of the old data record. Later on, a background sweeping mechanism reclaims the storage space of deleted data records when their new versions are present. The efficiency improvements may manifest in simplified solutions to data coherency requirements, and high data access throughput. Client applications' interactions with the DSS may affect the efficiency improvements. A client application, for example, may perform batch updates of a DSS. Batch updates may include operations to load (e.g., add) or delete a dataset (e.g. a collection of data) from a DSS. In a DSS where data is stored in tables (e.g., database tables), a dataset may include one or more tables of the storage system. Such append only DSS design has been proven its value in the open source data stores such as in Hadoop-like data stores, including Apache Hadoop, Apache HBase, Apache Accumulo and commercial databases such as IBM DB2-BLU and SAP HANA.

Various embodiments are directed towards a method for processing a dataset (e.g., performing batch updates of a dataset) in a partitioned distributed storage system (PDSS) having data and an index stored in tables (e.g., base and index tables, respectively). The processing includes updating the base tables of the PDSS with a large dataset while synchronously updating the index tables with index deltas corresponding with the dataset. The method may start by receiving metadata about the base and index tables. The dataset may then be partitioned according to base table partitioning and formatting requirements indicated in the base table metadata. Additionally, index deltas corresponding with the partitioned dataset may be generated according to index partitioning and formatting requirements indicated in the index table metadata. Partitions of the base and index tables may then be incrementally updated with the dataset partitions and generated index deltas.

Other embodiments are directed towards a system and computer program product for processing a dataset in partitioned distributed storage system where data is stored in tables.

As used herein, partitioned distributed storage systems are distributed storage systems where data is stored in partitions. A partition can be a logical (or physical) division of a storage space. A single compute node in a cluster may have one or more partitions. Datasets stored on a PDSS may be partitioned into files or blocks (e.g., a partition may include one or more files or blocks) according to one or more partitioning criteria, including key ranges or attribute values of the dataset. An attribute may be any property of a dataset, including for example metadata, while a key may be an identifier of the dataset derived from the dataset and/or associated attribute values. Disparate partitioned data files or blocks may contain non-overlapping data (e.g., data from a first file or block in a first partition may not be logically part of data from a second file or block in a second partition). In some embodiments, partitions may vary in size (e.g., number of bytes) and format (e.g., fire storage format).

As used herein, metadata may include data about a partitioned distributed storage system. A first type of metadata (e.g. base table metadata) may describe the base table of a PDSS, while a second type of metadata (e.g., index table metadata) may describe the index table. Base table metadata may include data about the size, locations, storage format, and/or partition criteria of base table partitions. Similarly, index table metadata may include metadata concerning the size, locations, storage format, and/or partition criteria of index table partitions. The metadata associated with a PDSS may change as datasets are updated on the storage system due to, for example, the addition or deletion of partitions.

Data stored on a partitioned distributed storage system may be stored in a base table. Records in the base table may include elements of the partitioned DSS, including files and partitions. In some embodiments, data in a PDSS base table partition may be stored in one or more partition file(s).

Data stored in the base table may be accessed by indexing. Indexing includes creation of a table (e.g., an index table) of lookup values that may be used to locate data on a storage system. The lookup values may be derived from one or more attribute value of the indexed data. The lookup values may also be derived from keys corresponding with the indexed data.

The base and index tables of a PDSS may be stored in multiple separate partitions (e.g., partition files) of the PDSS, and may be updated when the system is updated with a dataset. When a base table is updated with a dataset, an index table corresponding with the base table may be synchronously (e.g., occurring substantially at the same time) updated with a set of index-deltas (e.g. data references to be added to or deleted from an index table) associated with the dataset.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to the figures, FIG. 1 depicts a flowchart of a computer implemented method 100 for processing a dataset in a partitioned distributed storage system, according to various embodiments. The method 100 may be automatically carried out by a storage system management script or application controlling a partitioned distributed storage system. The PDSS may be implemented in a cloud computing environment such as the cloud computing environment shown FIG. 5. The storage system management script (hereinafter, the storage system) may reside on one or more compute nodes in the cloud computing environment, such as computer system 10 shown in FIG. 4. In some embodiments, the storage system may lock (e.g., prevent compute nodes and applications other than the storage system from updating) at least a partition of the base and index tables of the PDSS to ensure that the partition topology of the PDSS remains stable (e.g., unchanged) while executing the method 100.

The storage system may begin the method 100 at operation 105 by receiving a request from a client application to perform an update (e.g. a batch update) of the partitioned distributed storage system. The update request may include a requested update operation and a dataset. In some embodiments, the update operation may be a dataset load or a delete operation. A load operation may be a request to add a dataset to the PDSS, while a delete operation may be a request to remove a dataset from the PDSS.

The storage system may continue the method 100 by executing operation 110, receiving base and index table metadata from the PDSS. In embodiments where the PDSS is configured according to a master-worker architecture, the base and index table metadata may reside in a memory of a master compute node. In other embodiments, the base and index table metadata may be distributed in worker compute nodes, with one or more worker compute nodes having a portion or all of the metadata. The storage system may receive the metadata in response to a request for metadata sent from the storage system to one or more compute nodes. In certain embodiments, the storage system may receive the metadata automatically in response to receiving and/or processing an update request. Receiving the metadata may include reading the metadata from a network port or accessing an area of memory of a compute node executing the storage system management script.

In some embodiments, the base and index table metadata may include partition information, respectively, about the base and index tables. The partition information may include information about the sizes, locations, storage formats, and/or partition criteria for base and index table partitions. Partition size metadata specify the sizes in, for example, bytes, of a PDSS base and index partitions. Location metadata may identify the compute node associated with a given partition along with the location on the compute node of the partition. Storage format metadata may specify the format of partition files, while partition criteria may specify how partitions are allocated throughout the PDSS (e.g., the key or attribute value ranges allocated to a given partition). Base table partition sizes, formats, and/or partition criteria differ from those of index tables. Additionally, partition sizes, formats, and/or partition criteria may vary within and/or between compute nodes.

The storage system may continue the method 100 by executing operation 115. Executing operation 115 may include partitioning a dataset into a set of base-delta files according to the base table metadata. A base-delta file may correspond with (e.g., may be sized, formatted and allocated to fit) a base table partition of the PDSS that may be updated with the base-delta file. When the PDSS update is a load operation, a base delta-file may contain at least a portion of the dataset, and may be map to at least a portion of base table partition. When the PDSS update is a delete operation, a base-delta file may be a reference to at least a portion of a base table partition where the delete will occur (e.g., the base-delta file may identity the partition files or blocks to delete).

The storage system may use base table metadata to determine the size, and format of the base-delta files. The storage system may also use base table metadata to determine the base table partitions that may be updated with the base-delta file. In some embodiments, the storage system may partition a dataset to reduce the likelihood of individual base-delta files having overlapping data (e.g., data in a first base-delta file is substantially independent from data in a second base-delta file). In other embodiments the storage system may partition the base-delta files according to any other criteria specified in the base table metadata.

The method 100 may be further continued by executing operation 120, generating a set of index-delta files corresponding with the base-delta files. An index-delta file may correspond with at least a portion of an index table partition that may be updated with the index-delta file. The index-delta file may also contain references to at least a portion of the dataset as allocated to the base-delta files. In some embodiments, the storage system may generate the index-delta files by first determining (e.g., from the index table metadata) a criteria for generating index-deltas (e.g., a criteria for determining how references or keys should be assigned) from the base-deltas generated in operation 115. The storage system may then generate the index-deltas and use index table metadata to determine the size, format and other partition criteria to allocate (e.g., partition) the index-deltas to one or more index-delta files. The storage system may also use index table metadata to determine the index table partitions that may be updated with the index-delta files. In some embodiments, the index-delta files may be generated substantially in parallel with the partitioning of the dataset into base-delta files. In these embodiments, a first one or more nodes of the PDSS may generate the index-delta files while a second one or more nodes of the PDSS partitions the dataset into base-delta files. In other embodiments, the index delta files may be generated subsequent to the partitioning of the dataset into base-delta files. In particular embodiments, partition information about the base-delta files may inform the generation of the index delta files.

The storage system may continue the method 100 at operation 125 by updating the partitioned distributed storage system with the base-delta and index-delta files. When the PDSS update request is for a load operation, executing operation 125 may include incrementally updating the PDSS by copying the base-delta and index-delta files, respectively, into existing partitions of the base and index tables which physically reside in respective compute nodes. In some embodiments new partitions may be created in the base and index tables, with the base-delta and index-delta files being subsequently copied into the newly created partitions. In embodiments where the base-delta and index-delta files are partitioned to reduce the likelihood of overlap between files, incrementally updating the PDSS may include one or more compute nodes copying the base-delta and index-delta files to the PDSS in parallel. The base and index table metadata may be also be updated to reflect the addition of newly added delta files.

When the partitioned distributed storage system update is a delete operation request, operation 125 may include incrementally deleting at least a portion of the base and index table partitions referenced by the base-delta and index files. Similar to the load operation, the base and index table metadata may be also be updated to reflect the deletion.

The method 100 may end at operation 135. In some embodiments, the storage system may end the method 100 unlocking the base and index tables.

Figure 2:
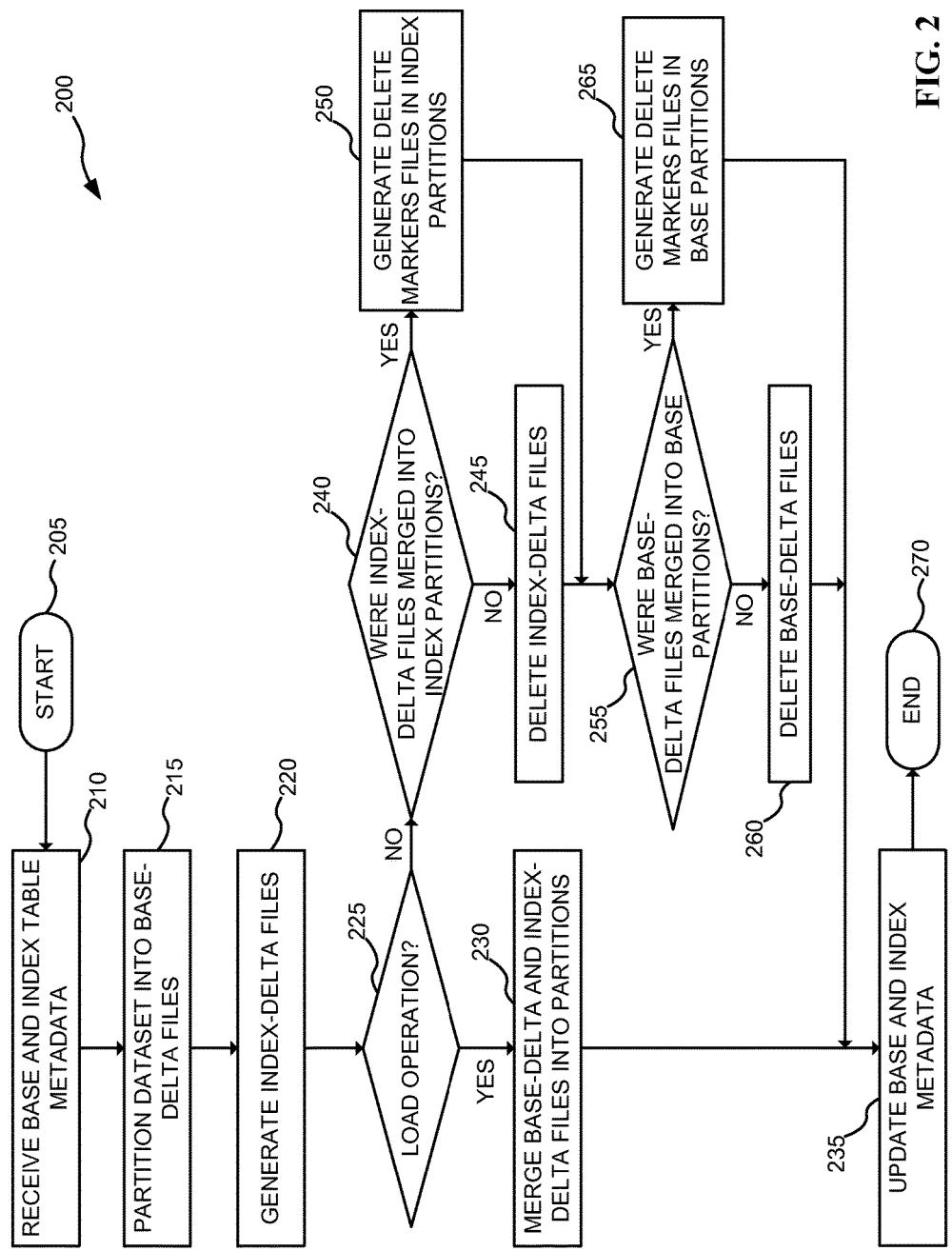
FIG. 2 depicts a second flowchart of a computer implemented method for processing a dataset in a partitioned distributed storage system, according to various embodiments.

FIG. 2 depicts a second flowchart of a computer implemented method 200 for processing a dataset in a partitioned distributed storage system, according to various embodiments. The method 200 may be automatically carried out by a storage system management script or application controlling a PDSS. The PDSS may be implemented in a cloud computing environment such as the cloud computing environment shown FIG. 5. The storage system management script may reside on one or more compute nodes in the cloud computing environment, such as computer system 10 shown in FIG. 4. In some embodiments, the storage system may lock at least a partition of the base and index tables to ensure that the partition topology of the PDSS remains stable (e.g., unchanged) while executing the method 200.

The storage system may begin the method 200 at operation 205 by receiving a PDSS update request, as described herein. When the PDSS update request is for a load operation, the storage system may lock the base and index tables to prevent updates to the PDSS by other processes. When the PDSS update request is for a delete operation, the storage system may partially lock the base and index tables (e.g., the storage system may prevent region splits, merges, and data movement).

The storage system may continue the method 200 at operation 210 by receiving base and index table metadata. The storage system may receive base and index table metadata according to the steps described during the discussion of operation 110 of the method 100.

The storage system may then execute operation 215 by partitioning a dataset into a set of one or more base-delta files. The storage system may partition the dataset into a set of one or more base delta files according to the steps described during the discussion of operation 115 of the method 100.

The storage system may then proceed to operation 220 and generate a set of one or more index-delta files corresponding with the base-delta files. The storage system may generate a set of one or more index-delta files according to the steps described during the discussion of operation 120 of the method 100.

The storage system may then continue the method 200 at operation 225 by determining whether the PDSS update is a load operation. The storage system may proceed to operation 230 when the PDSS update is a load operation. Alternatively, the storage system may proceed to operation 240 when the PDSS update is not a load operation (e.g., the update is a delete operation).

The storage system may perform operation 230 (e.g., perform the load operation) by merging (e.g., copying) the base-delta and index-delta files from operations 215 and 220 into respective partitions of the base and index tables, as described in operation 125 of the method 100. The storage system may then proceed to operation 235.

When the storage system determines at operation 225 that the PDSS update is not load operation, the storage system may perform operation 240 by determining whether the index delta files generated in operation 220 were merged in to the index table partitions. When an index-delta file is copied to an index table partition during a load operation, the index-delta may exist as an individual block in an index table partition. During the course of operation of the storage system, an index-delta file may be merged with one or more other index files, creating a new unified index file. The unified index file may contain data marked for deletion (e.g., an index-delta file) and data not marked for deletion. Operation 240 determines whether the index-delta files identified for deletion still exists as an individual data blocks or files.

When the index-delta files have not been merged, the storage manager may perform operation 245 and delete the index-delta files from the index table partitions. When the index-delta file have been merged, the storage manager may perform operation 250 and generate delete markers files in the index partitions having the merged index-delta files. A delete markers file may indicate to the storage system to treat blocks listed in the delete markers file (e.g., where a block corresponds with an index-delta file) as if they were deleted from the system. The storage system may proceed to operation 255 after executing operation 245 or 250.

The storage system may perform operation 255 by determining whether the base-delta files generated in operation 215 were merged in to the base table partitions of the PDSS.

When a base-delta file is copied to a base table partition during a load operation, the base-delta file may exist as an individual block in a base table partition. During the course of execution of the storage system, a base-delta file may be merged with one or more other base table files, creating a new unified base table file. The unified base table file may contain data marked for deletion (e.g., a base-delta file) and data not marked for deletion. Operation 255 determines whether the base-delta files identified for deletion still exists as an individual data blocks or files.

When the base-delta files have not been merged, the storage manager may perform operation 260 and delete the base-delta files from the base table partitions. When the base-delta files have been merged, the storage manager may perform operation 265 and generate delete markers files in the base table partitions having the merged base-delta files. The storage system may proceed to operation 235 after executing operation 260 or 265.

The storage system may continue the method 200 at operation 235 by updating the base and index metadata to reflect the addition or deletion of the base-delta and index-delta files. During a load update, base and index table metadata may be updated to, for example, include references to the base-delta and index-delta files. Additionally, the base and index table metadata may be updated to indicate the creation of one or more base and/or index table partitions when new partitions are created to accommodate the base-delta and index delta files. When the PDSS update is a delete operation, the base and index table metadata, may be updated to indicate, for example, the deletion of one or more base and/or index table partitions. The base and index table metadata may also be updated to indicate the creation of one or more delete markers files, as described herein.

The method 200 may end at operation 270. In some embodiments, the storage system may end the method 200 by unlocking the base and index tables.

Figure 3:
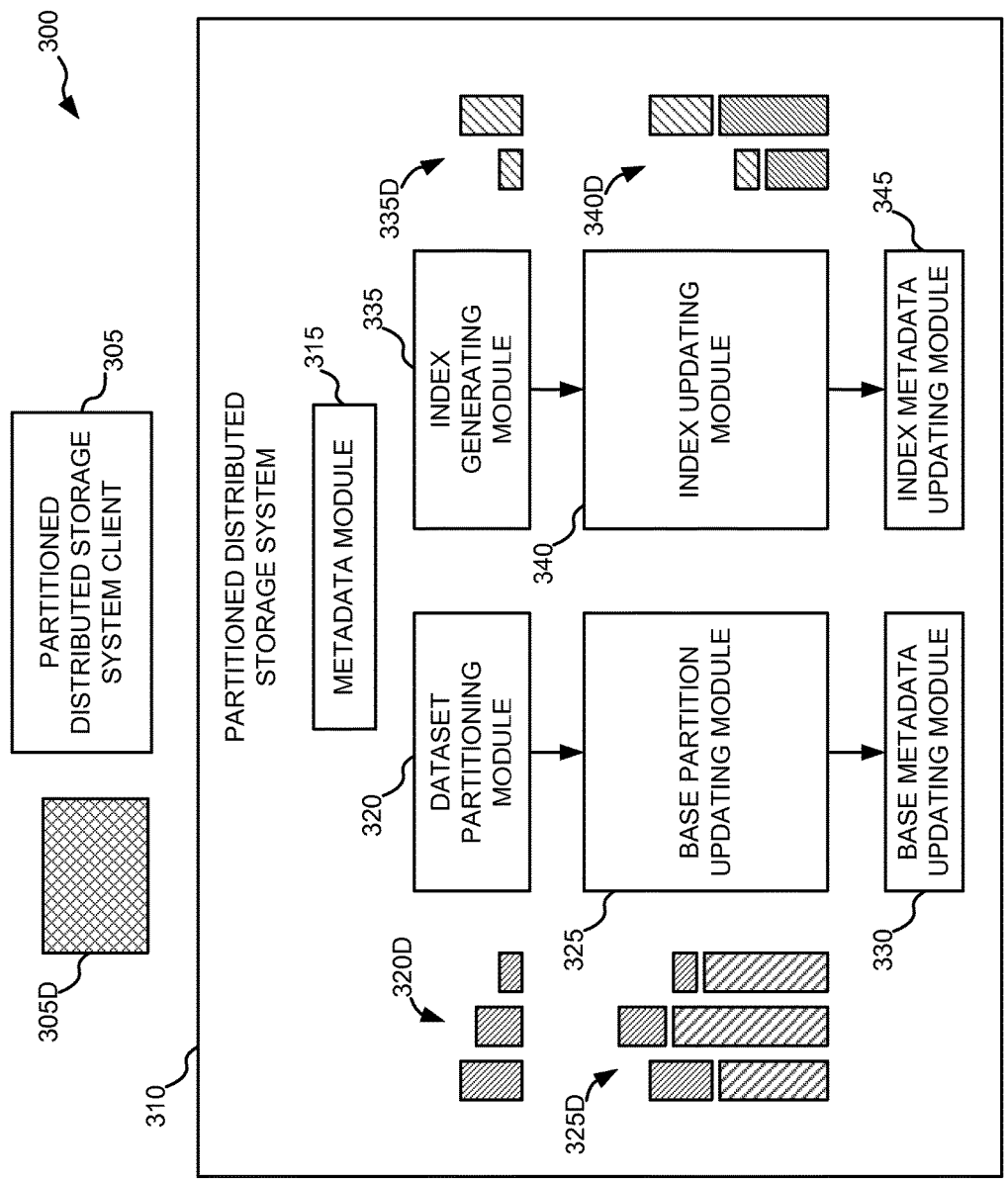
FIG. 3 depicts a block diagram of distributed storage system environment, according to various embodiments.

FIG. 3 depicts a block diagram of a partitioned distributed storage system environment 300, according to various embodiments. The partitioned distributed storage system environment 300 includes partitioned distributed storage system client 305 and partitioned distributed storage system 310. In some embodiments, the partitioned distributed system environment 300 may be a cloud computing environment such as the cloud computing environment shown in FIG. 5, where the partitioned distributed storage system client 305 (herein after client 305) interacts with the PDSS 310 through a communications network.

Figure 4:
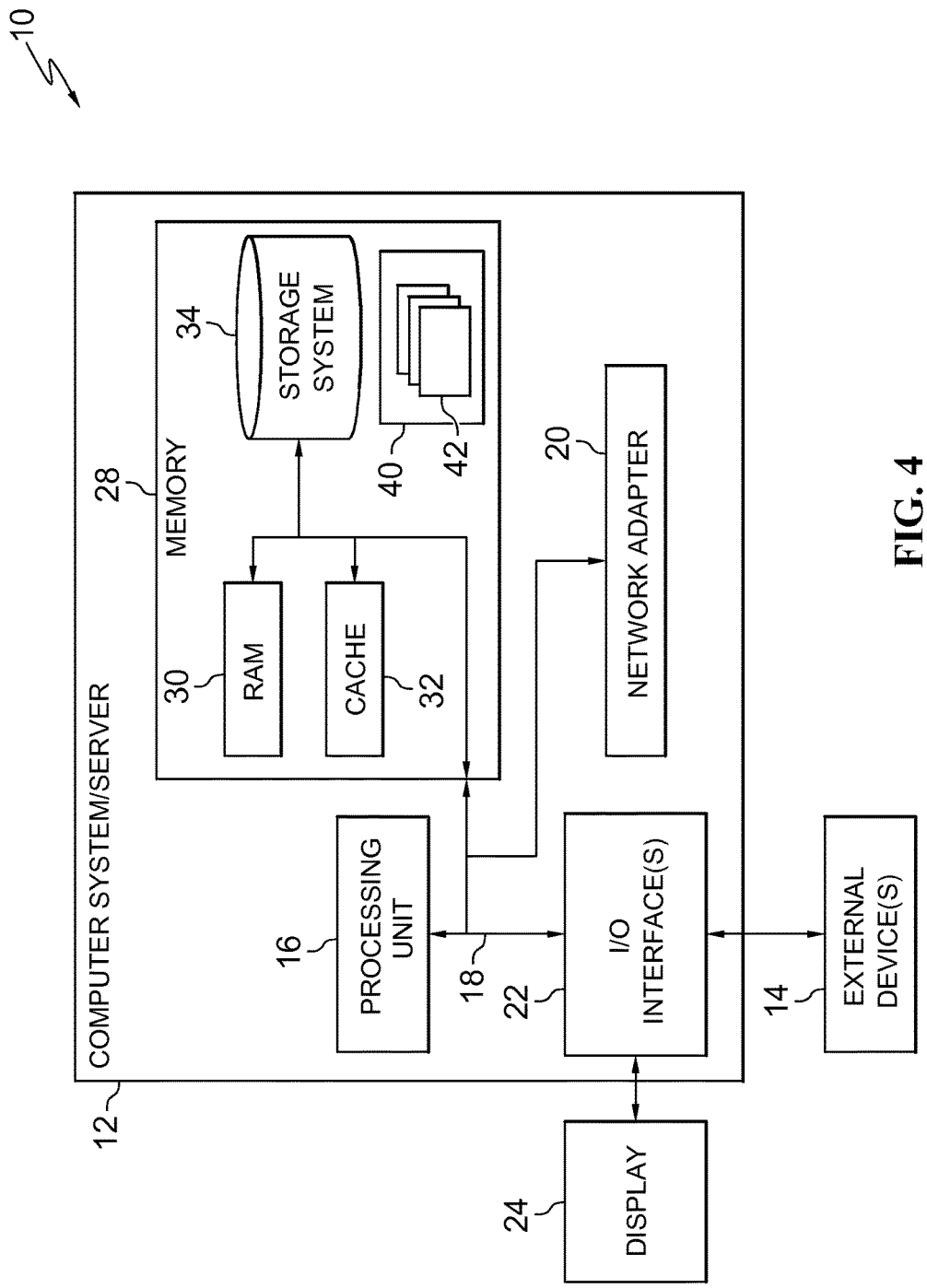
FIG. 4 depicts a cloud computing node according to various embodiments of the present invention.
Figure 6:
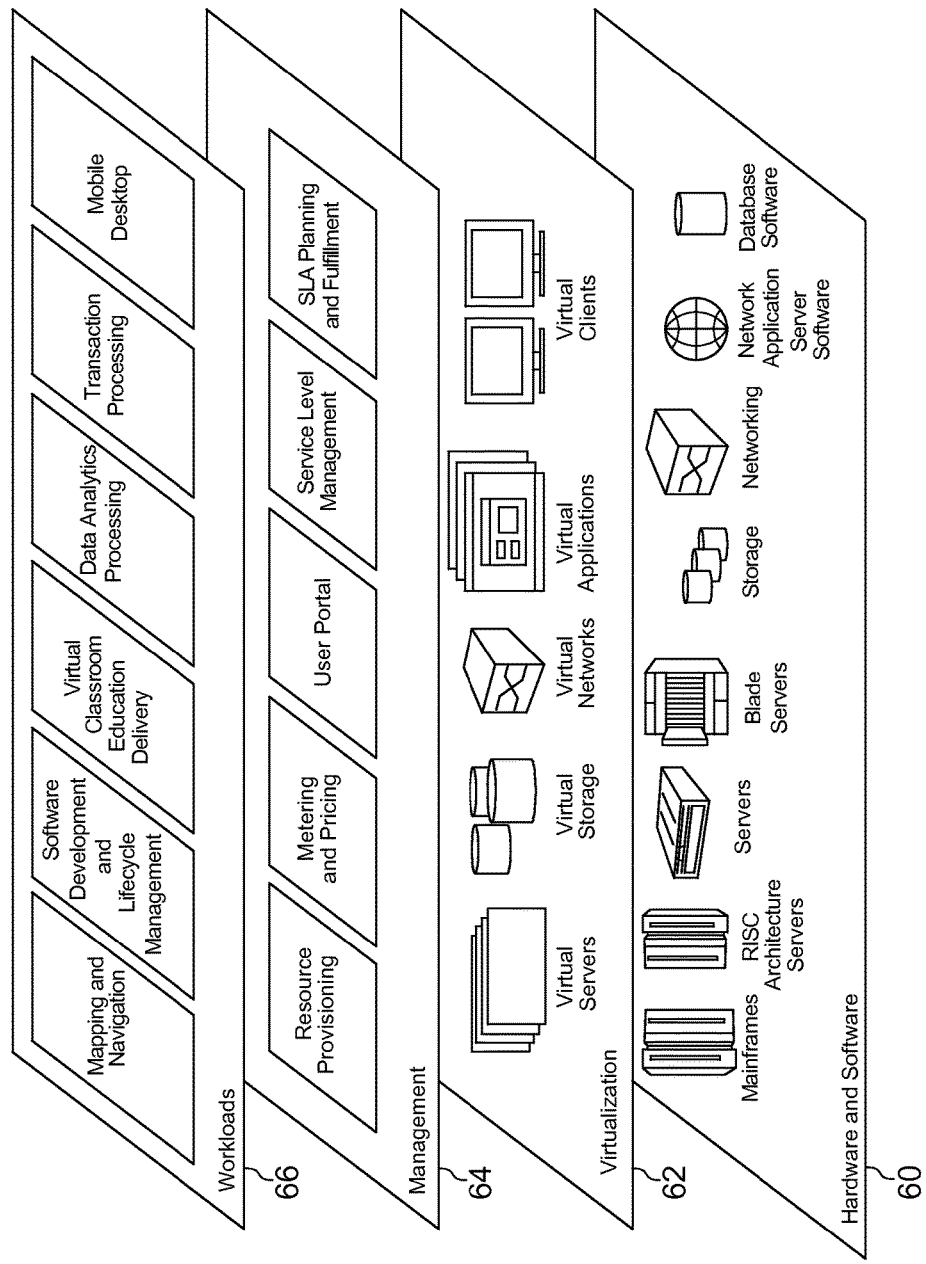
FIG. 6 depicts abstraction model layers according to various embodiments of the present invention.

Client 305 may be a compute node such as computer system 10 shown in FIG. 4 or a virtual client executing, for example, a data analytics processing application as shown in FIG. 6. Client 305 may be configured to negotiate data transactions (e.g., data reads, loads, and deletes) with PDSS 310. Client 305 may generate dataset 305D and transmit the dataset over a communications network in a negotiated operation to, for example, update the PDSS 310.

In some embodiments, partitioned distributed storage system 310 may be a PDSS such as an Apache Hadoop Distributed File System or International Business Machines' General Parallel File System File Placement Optimizer. The PDSS 310 may include metadata module 315, dataset partitioning module 320, base partition updating module 325, base metadata updating module 330, index generating module 335, index updating module 340, and index metadata updating module 345. PDSS 310 may be embodied in a cluster(s) or one or more computing nodes in a cloud computing environment such as the cloud computing environment shown FIG. 5. In some embodiments, the PDSS 310 may be a combination of storage systems illustrated on both the hardware and software, and virtualization cloud computing layers shown in FIG. 6. A storage system management script or application may automatically negotiate data transactions with the client 305, and may facilitate interactions between the modules of the PDSS 310 to execute the operations of the methods described herein. The storage system management script, and the modules included in the PDSS 310 may exist on a single compute node, or may be distributed amongst a plurality of compute nodes.

The metadata module 315 may receive a request from the storage system (e.g., the storage system management script) to obtain base and index table metadata for the PDSS 310. In some embodiments, the metadata module 315 may obtain the base and index table metadata from a compute node configured to aggregate and maintain the PDSS 310 metadata (e.g., a master compute node). In other embodiments, metadata module 315 may obtain the metadata by querying a plurality of compute nodes of the PDSS 310. Metadata module 315 may provide the metadata to the storage system by writing it to a file or an area of memory of a compute node that is accessible to the storage system.

The dataset partitioning module 320 may receive the dataset 305D, along with base table metadata from the storage system. The dataset partitioning module 320 may be configured to partition the dataset 305D into one or more base-delta files 320D. The one or more base-delta files 320D may be partitioned as described herein, with the dataset partitioning module 320 allocating portions of the dataset 305D to the one or more base-delta files according to the base table partition sizes, formats, and other partitioning criteria specified in the base table metadata. The dataset partitioning module 320 may provide the one or more base-delta files 320D to the storage system.

The base partition updating module 325 may receive the one or more base-delta files 320D from the storage system for updating one or more base table partitions. In some embodiments, the base partition updating module 325 may be distributed amongst one or more compute nodes of the PDSS, with at least one compute node receiving one or more of the base-delta files 320D. Distributing the base partition updating module 325 amongst one or more compute nodes may enable the PDSS to be updated with multiple with multiple base-delta files in parallel (e.g., a first node be updated with a first base-delta file concurrently with a second node being updated with a second base-delta file). The base partition updating module 325 may be configured to copy (e.g., during a load update operation) the one or more base-delta files 320D into existing base table partitions of the at least one compute node. Additionally, the base partition updating module 325 may be configured to create new base table partitions on the at least one compute node(s) when existing base table partitions cannot accommodate the one or more base-delta files 320D.

The base partition updating module 325 may also be configured to delete (e.g., during a delete update operation) one or more partitions (or data blocks) identified by the one or more base-delta files 320D from at least one compute node of the PDSS. In some embodiments, base partition updating module may be further configured to generate one or more delete markers files in the base table partitions identified by the one or more base-delta files 320D. The base partition updating module 325 may provide the updated base table partition files 325D to the storage system. The updated base table partition files 325D may include existing base table partitions (e.g., lightly hatched boxes) and the base-delta files (e.g., heavily hatched boxes).

The base metadata updating module 330 may receive updated partition topology information (e.g., including size, format), along with partition file attributes and metadata from the storage system. In some embodiments, the base metadata updating module may be configured to update base table metadata or generate new base table metadata to include the updated partition topology information, partition file attributes and metadata. The base metadata updating module 330 may provide the new or updated base table metadata to the storage system.

The index generating module 335 may receive the dataset 305D, along with index table metadata from the storage system. In some embodiments, the index generating module 335 may be configured to generate one or more index-delta files 335D corresponding with the dataset 305D. The index-delta files may be generated as described herein, with the index generating module 335 allocating ranges (or portions) of indices of the dataset 305D to the index-delta files 335D according to the index table partition size, format, and other partitioning criteria specified in the index table metadata. The index generating module 335 may provide the index-delta files 335D to the storage system.

The index updating module 340 may receive the index-delta files 335D from the storage system for merging with one or more index table partitions. In some embodiments, index updating module 340 may be distributed amongst a one or more compute nodes of the PDSS, with at least one node receiving one or more of the index-delta files 335D. Distributing the index partition updating module 325 and the index-delta files 335D amongst one or more compute nodes may enable the PDSS to be updated with multiple index-delta files in parallel. The index updating module 340 may be configured to copy (e.g., during a load update operation) the one or more index-delta files 335D into existing index table partitions of the at least one compute node. Additionally, the index updating module 340 may be configured to create new index table partitions on the at least one compute node when existing index table partitions cannot accommodate the one or more index-delta files 335D. The index updating module 340 may also be configured to delete one or more partitions (or data blocks) identified by the one or more index-delta files 335D from the at least one compute node. In some embodiments, index updating module 340 may be further configured to generate one or more delete markers files in the index partitions identified by the index-delta files 335D. The index updating module 340 may provide the updated index table partition files 340D to the storage system. The updated index table partition files 340D may include existing index table partitions (e.g., heavily hatched boxes) and the index-delta files (e.g., lightly hatched boxes).

The index metadata update module 345 may receive updated index table partition topology information (e.g., size, and format) and partition file attributes and metadata from the storage system. In some embodiments, the index metadata update module 345 may be configured to update index table metadata or generate new index table metadata to include the updated partition topology information (e.g., size, and format) and partition file attributes and metadata. The index metadata update module 345 may provide the new or updated index table metadata to the storage system.

In FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
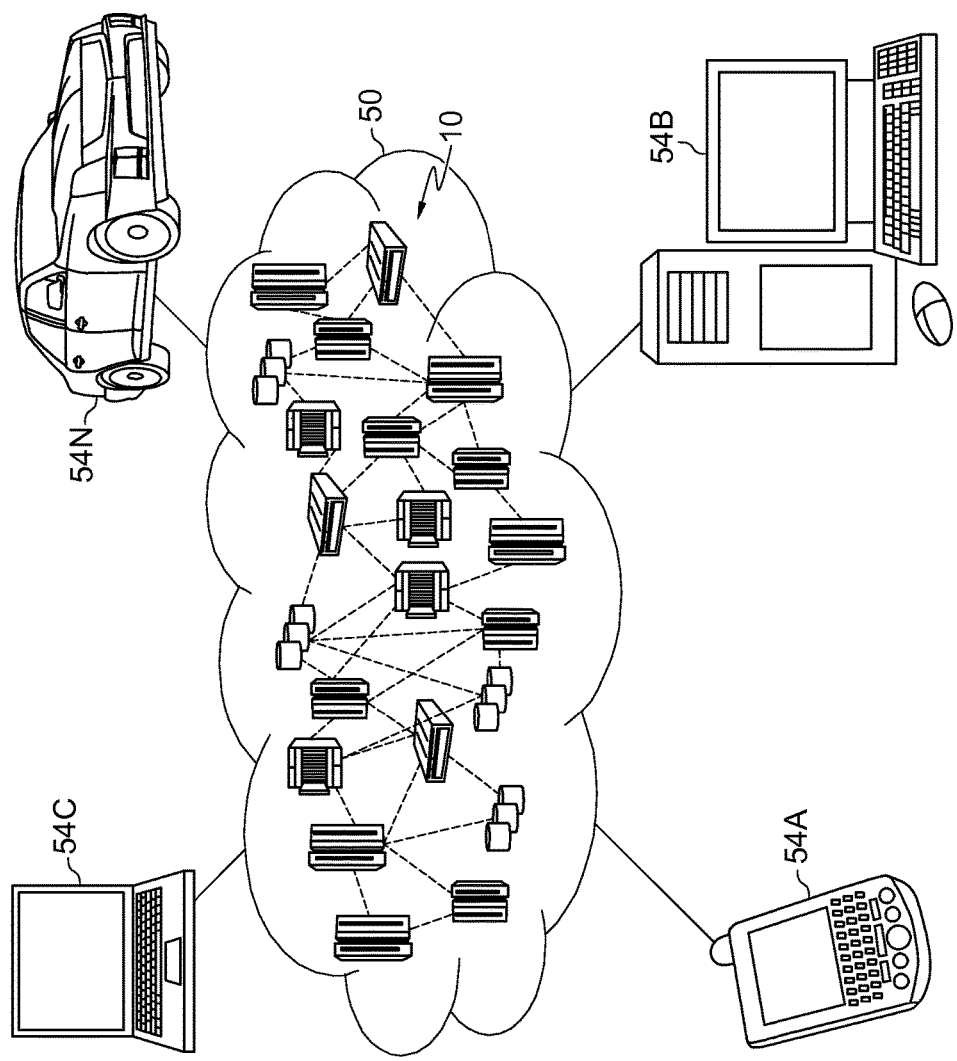
FIG. 5 depicts a cloud computing environment, according to various embodiments of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for maintaining an index of a processing a dataset in a partitioned distributed storage system after a batch update of a dataset, the partitioned distributed storage system having data stored in a base table and an index stored in an index table, comprising:

locking the base table and the index table to prevent external update operations;

receiving base and index table metadata from the partitioned distributed storage system, wherein the base table metadata and the index table metadata include respective base table partition information and index table partition information;

partitioning the dataset into a set of base-delta files according to the base table metadata;

generating a set of index-delta files corresponding with the base-delta files according to the index table metadata;

updating the partitioned distributed storage system with the set of base-delta files and the set of index-delta files, wherein a first update of the base table is synchronous with a second update of the index table; and unlocking, subsequent to the update, the base table and the index table.

2. The method of claim 1, wherein the partitioning comprises:

determining from the base table metadata a partitioning criteria; and allocating the dataset to the set of base-delta files according to a partitioning criteria.

3. The method of claim 1, wherein the generating comprises:
determining from the index table metadata a criteria for generating index-deltas from a set of base table deltas, wherein the set of base table deltas include the dataset as allocated to the base-delta files, and the set of index-deltas include references to the set of base table deltas;
generating the index-deltas according to the criteria for generating index-deltas; and
determining from the index table metadata a partitioning criteria for allocating the set of index deltas to the set of index-delta files;
allocating the set of index-deltas to the set of index-delta files according to the partitioning criteria.

4. The method of claim 1, wherein the updating comprises:
merging the set of base-delta and the set of index-delta files into a respective one or more corresponding partitions of the base and index tables; and
updating the base and index table metadata in the partitioned distributed storage system.

5. The method of claim 4, wherein the base table is updated in parallel with the index table.

6. The method of claim 4, wherein a plurality of partitioned base tables and index tables are updated in parallel.

7. The method of claim 1, wherein the updating comprises:
deleting the set of base-delta files and set of index-delta files in a respective one or more corresponding partitions of the base and index tables; and
updating the base table metadata and the index table metadata in the partitioned distributed storage system.

8. The method of claim 7, wherein the deleting comprises:
determining whether the set of base-delta files have been merged with respective partitions of the base table;
deleting, in response to determining that the set of base-delta files have not been merged, the set of base-delta files from the respective partitions of the base table; and
generating, in response to determining that the set of base-delta files have been merged, delete markers files corresponding with the set of base-delta files in respective partitions of the base table.

9. The method of claim 7, wherein the deleting comprises:
determining whether the set of index-delta files have been merged with respective partitions of the index table;
deleting, in response to determining that the set of index-delta files have not been merged, the set of index-delta files from the respective partitions of the index table; and
generating, in response to determining that the set of index-delta files have been merged, delete markers files corresponding with the set of index-delta files in respective partitions of the index table.

10. The method of claim 1, wherein the partitioned distributed storage system is a Hadoop-like distributed file system.

11. A system for maintaining an index of a partitioned distributed storage system having data stored in a base table and an index stored in an index table, comprising:
one or more computing nodes having a memory and a hardware processor; and
a non-transitory computer readable storage medium of the one or more computing nodes having program instructions embodied therewith, the program instructions executable by the processor to cause the system to:
lock the base table and the index table to prevent external update operations;
receive base and index table metadata from the partitioned distributed storage system, wherein the base table metadata and the index table metadata include respective base table partition information and index table partition information;
partition the dataset into a set of base-delta files according to the base table metadata;
generate a set of index-delta files corresponding with the base-delta files according to the index table metadata; and
update the partitioned distributed storage system with the set of base-delta files and the set of index-delta files,
wherein a first update of the base table is synchronous with a second update of the index table; and
unlock, subsequent to the update, the base table and the index table.

12. The system of claim 11, wherein the program instructions executable by the processor further causes the system to:
determine from the base table metadata a partitioning criteria; and
allocate the dataset to the set of base-delta files according to a partitioning criteria.

13. The system of claim 11, wherein the program instructions executable by the processor further causes the system to:
determine from the index table metadata a criteria for generating index-deltas from a set of base table deltas, wherein the set of base table deltas include the dataset as allocated to the base-delta files, and the set of index-deltas include references to the set of base table deltas;
generate the index-deltas according to the criteria for generating index-deltas; and
determine from the index table metadata a partitioning criteria for allocating the set of index deltas to the set of index-delta files; and
allocating the set of index-deltas to the set of index-delta files according to the partitioning criteria.

14. The system of claim 11, wherein the program instructions executable by the processor further causes the system to:
merge the set of base-delta files and the set of index-delta files into a respective one or more corresponding partitions of the base and index tables; and
update the base table metadata and the table metadata in the partitioned distributed storage system.

15. The system of claim 11, wherein the program instructions executable by the processor further causes the system to:
delete the set of base-delta files and the set of index-delta files in a respective one or more corresponding partitions of the base and index tables; and
update the base table metadata and the index table metadata in the partitioned distributed storage system.

16. A computer program product for processing a dataset in a partitioned distributed storage system having data stored in a base table and an index stored in an index table, the computer program product including a computer readable storage medium having program instructions embodied therewith, wherein the computer readable storage medium is not a transitory signal per se, the program instructions executable by a processing circuit to cause the processing circuit to perform a method comprising:
- locking the base table and the index table to prevent external update operations;
- receiving base and index table metadata from the partitioned distributed storage system, wherein the base table metadata and the index table metadata include respective base table partition information and index table partition information;
- partitioning the dataset into a set of base-delta files according to the base table metadata;
- generating a set of index-delta files corresponding with the base-delta files according to the index table metadata;
- updating the partitioned distributed storage system with the set of base-delta files and the set of index-delta files, wherein a first update of the base table is synchronous with a second update of the index table; and
- unlocking, subsequent to the second update, the base table and the index table.

17. The computer program product of claim 16, wherein the program instructions executable by the processor further causes the system to:
- determining from the base table metadata a partitioning criteria; and
- allocating the dataset to the set of base-delta files according to a partitioning criteria.

18. The computer program product of claim 16, wherein the generating comprises:
- determining from the index table metadata a criteria for generating index-deltas from a set of base table deltas, wherein the set of base table deltas include the dataset as allocated to the base-delta files, and the set of index-deltas include references to the set of base table deltas;
- generating the index-deltas according to the criteria for generating index-deltas; and
- determining from the index table metadata a partitioning criteria for allocating the set of index deltas to the set of index-delta files;
- allocating the set of index-deltas to the set of index-delta files according to the partitioning criteria.

19. The computer program product of claim 16, wherein the updating comprises:
- merging the set of base-delta and the set of index-delta files into a respective one or more corresponding partitions of the base and index tables; and
- updating the base table metadata and the table metadata in the partitioned distributed storage system.

20. The computer program product of claim 16, wherein the updating comprises:
- deleting the set of base-delta files and the set of index-delta files in a respective one or more corresponding partitions of the base and index tables; and
- updating the base table metadata and the index table metadata in the partitioned distributed storage system.

* * * * *